May 31, 1949.  J. J. BLOOMFIELD  2,471,858
BRAKE COOLING MEANS
Original Filed July 12, 1943  2 Sheets-Sheet 1
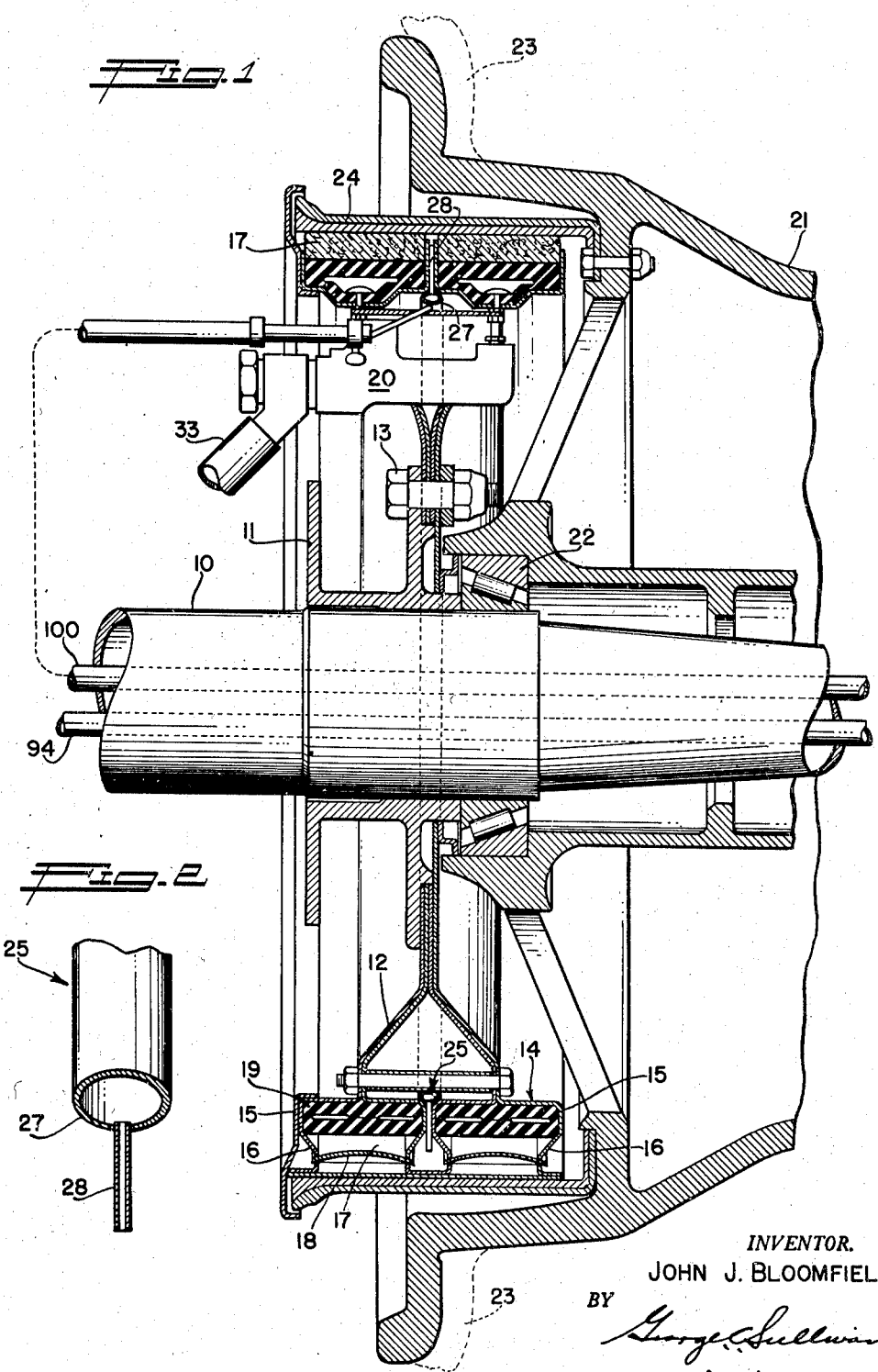
INVENTOR.
JOHN J. BLOOMFIELD
BY
George C. Sullivan
Agent

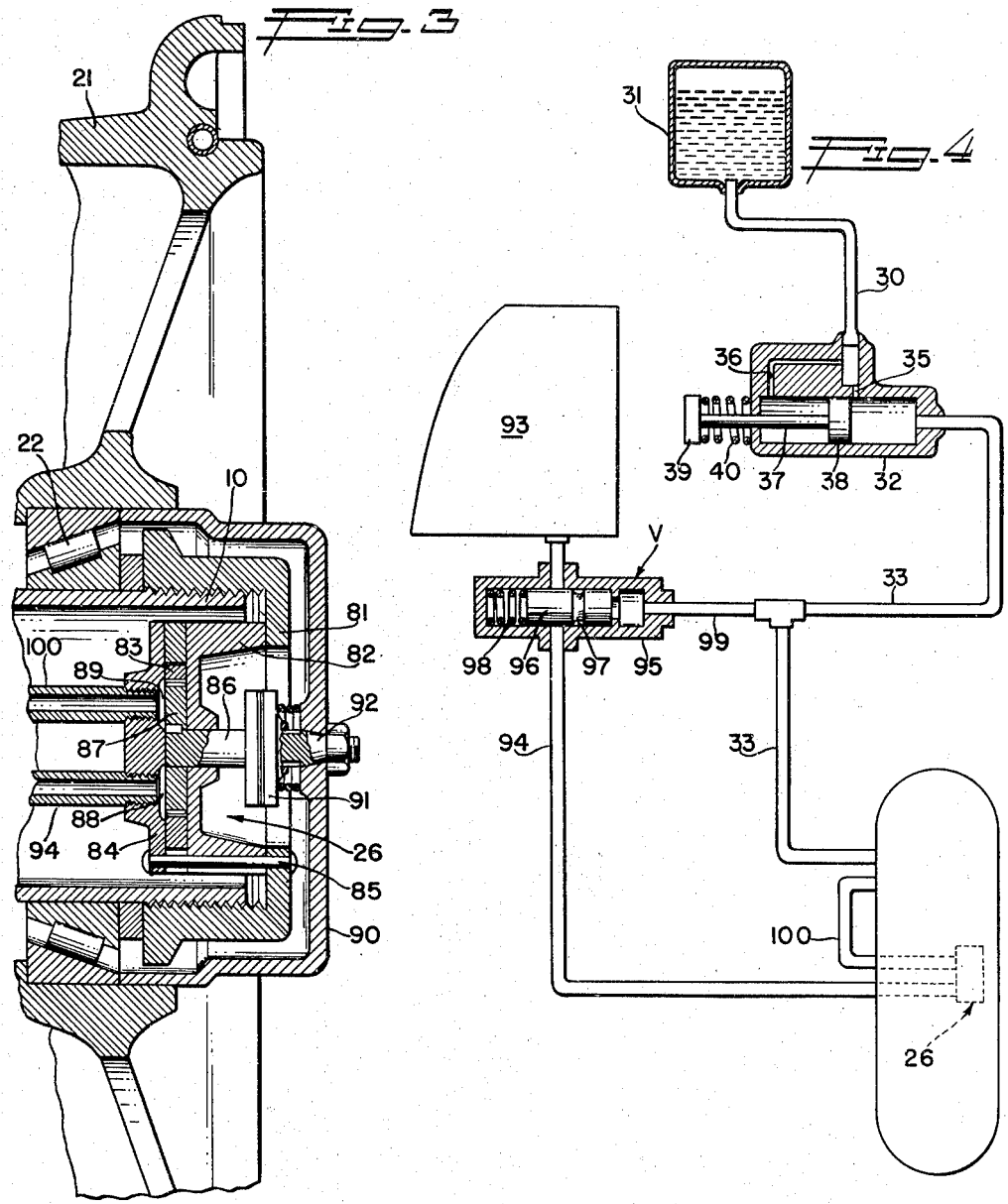

Patented May 31, 1949

2,471,858

UNITED STATES PATENT OFFICE 2,471,858

BRAKE COOLING MEANS

John J. Bloomfield, Burbank, Calif., assignor to Lockheed Aircraft Corporation, Burbank, Calif.

Original application July 12, 1943, Serial No. 494,330. Divided and this application June 22, 1945, Serial No. 600,946

9 Claims. (Cl. 188—264)

This invention relates to brake mechanisms and relates more particularly to means for dissipating from such mechanisms, the heat generated as a result of the braking action. A general object of the invention is to provide a brake mechanism or system embodying practical, dependable and effective means for dissipating the heat generated during the braking operation.

This application is a division of application, Serial No. 494,330, filed July 12, 1943, issued as United States Letters Patent 2,409,099, October 8, 1946.

The present invention, while not confined to any given application or field, is well suited for embodiment in the brake systems of airplane landing wheels. Accordingly, the invention will herein be referred to as used in such systems, it being understood that this is merely one typical application and is not to be construed as limiting either the scope or the application of the invention.

When the brakes of airplane landing wheels are operated, high temperatures are created in the brake mechanisms, producing rapid deterioration of the expander tubes, brake lining, tires, etc. Only a small portion of the heat energy generated is immediately dissipated by atmospheric convection and radiation, and the balance is absorbed by the brake mechanism with damaging results.

An important object of this invention is to provide a brake mechanism embodying means for supplying a liquid coolant to the brake drum, shoes and adjacent parts to effect a rapid and efficient transference of the heat generated during braking.

Another object of the invention is to provide a brake cooling means of the character referred to in which the cooling medium, water, for example, is caused to vaporize upon delivery to the heated parts or immediately thereafter.

Another object of the invention is to provide a brake cooling means of the character referred to having a time delay or control means that delays the initial delivery of the water to the brake parts until the maximum brake pressure is approached. This feature avoids the unnecessary delivery of the coolant during taxiing and similar operations when the brake is employed but is not subject to overheating.

Another object of the invention is to provide a brake cooling means that requires little or no modification of the conventional landing gear, brake and wheel structures.

Another object of the invention is to provide a brake cooling means of the general character referred to in which the pressure for delivering the water or coolant to the brake parts is generated by a pump operated by rotation of the landing wheel and the discharge of the water is timed or controlled by the pressure in the hydraulic brake operating line.

A further object of the invention is to provide brake cooling means of the character referred to that cannot interfere with the normal operation of the brake system and that requires a minimum of additional weight in the assembly.

Other objectives and features of the invention will become apparent from the following detailed description of a typical embodiment of the invention wherein reference is made to the accompanying drawings in which:

Fig. 1 is a sectional view of a wheel and brake assembly embodying features of the invention;

Figure 2 is an enlarged fragmentary sectional view of the coolant discharge manifold;

Figure 3 is a fragmentary sectional view of an end portion of the wheel assembly illustrating the coolant pump of the invention; and Figure 4 is a diagrammatic view illustrating the hydraulic pressure system of the brake and the coolant supply system associated therewith.

In the drawings there is illustrated a portion of a typical landing wheel and brake assembly. This assembly includes a relatively stationary axle 10 and a brake supporting structure secured to the axle. Said structure includes a hub or collar 11 fixed or keyed to the axle 10 and an annular carrier 12 secured to the collar 11 by bolts 13. The outer portion of the carrier 12 supports a rim 14. In the case illustrated, the rim 14 has two continuous channels 15 whose side walls are provided with pairs of opposing lugs 16. Segmental shoes 17 of friction material are engaged in the channels 15 and the end portions of the shoes are reduced in width to cooperate with the lugs 16. Inwardly bowed leaf springs 18 have their ends anchored in the lugs 16 and bear inwardly against the reduced end portions of the shoes 17 to yieldingly urge the shoes inwardly. Expander tubes 19 of flexible resilient material such as synthetic rubber, are provided within the channels 15 at the inner sides of the series of shoes 17. A manifold fitting 20 communicates with the interior of the expander tubes 19 and fluid pressure is supplied to the fitting to expand the tubes as will be more fully described.

A wheel assembly 21 is supported on the axle 10 by bearings 22 and the rim of the wheel carries the usual tire 23. A brake drum 24 is bolted or otherwise fixed to an end of the wheel assembly 21, and extends axially therefrom to be in surrounding relation to the brake shoes 17. Upon the delivery of fluid pressure to the interiors of the expander tubes 19, the tubes expand and force the shoes 17 radially outward into braking engagement with the drum 24. The structure thus far described may be considered as conventional.

The brake cooling means of the invention may be said to comprise generally means 25 for supplying coolant to the brake parts, and means 26 operable by rotation of the wheel 21 for delivering coolant under pressure to the means 25.

The means 25 serves to spray or discharge the coolant onto the brake drum 24, shoes 17, etc., and includes an annular tubular manifold 27 secured to the internal surface of the rim 14. It is preferred to position the manifold 27 in the radialplane which extends between the sets of shoes 17. A plurality of circumferentially spaced nozzle tubes 28 is provided on the manifold 27. The tubes 28 extend outwardly through openings in the rim 14 and are received between the two rows or series of shoes. The outer ends of the discharge tubes 28 are spaced from the active faces of the brake shoes 17 and the internal surface of the drum 24 to permit an effective dispersion of the discharged coolant. The cross sectional dimension of the fluid passage in the manifold 27 is greater than the aggregate cross-sectional areas of the passages in the tubes 28 to insure a substantially uniform delivery of coolant to the several tubes.

The means 26 serves to supply the coolant under pressure to the spray means or discharge means 25, and in accordance with the invention, is associated with and governed by the hydraulic brake operating system. The brake cooling means may be employed with hydraulic brake operating systems of various makes and types, and is not to be considered as confined to use with the typical operating system illustrated. The hydraulic system shown in Figure 4 includes a liquid supply line 30 leading from a reservoir 31 to a master cylinder 32. A line 33 extends from the master cylinder to the above described manifold 20 so as to communicate with the expander tubes 19. The pressure line 33 communicates with the inner or forward end of the cylinder 32 and ports 35 and 36 leading from the supply line 30 communicate with the cylinder at longitudinally spaced points. A piston 38 operates in the cylinder 32 and carries a rod 37 which extends from the rear end of the cylinder. An operating head 39 is provided on the rod 37 and a spring 40 is arranged under compression between the head 39 and the cylinder 32 to normally urge the rod outwardly so that the piston 38 occupies the rear portion of the cylinder.

When the piston rod 37 is actuated inwardly, the piston 38 is moved past the port 35 to trap a body of liquid in the forward portion of the cylinder opening and upon continued movement of the piston, the liquid in the cylinder, the line 33, and the expander tubes 19, is put under pressure. This results in expansion of the tubes 19 which actuate the brake shoes 17 outwardly against the drum 24 to effect the braking action.

In accordance with the invention, the means 26 for supplying coolant under pressure to the discharge means 25 includes a pump operated by rotation of the wheel 21. The pump may be of any preferred or selected type. In the drawings I have shown a gear pump having a casing housed within the outer portion of the tubular axle 10. A cap 81 is threadedly secured to the end portion of the axle 10, and the pump casing has a base section 82 arranged against the inner side of the cap. A rotatable annular internal gear 83 is arranged at the inner end of section 82 and a head section 84 is arranged at the inner face of the gear. Spaced bolts or screws 85 may serve to secure the assembly of the section 82 and section 84 to the cap 81. A shaft 86 enters the outer end of the section 82 and a gear 87 is keyed or otherwise fixed on the shaft to mesh with the internal gear 83. An inlet or low pressure port 88 is provided in the cap section 84 and a high pressure port 89 is provided in the section, the ports communicating with the interior of the pump chamber at diametrically opposite points. The gear pump just described is of a well known type, it being understood that other equivalent or similar pumps may be employed if desired.

In accordance with the invention, the pump described above is driven or operated upon rotation of the landing wheel 21. The wheel rotates during the landing of the craft and this rotation is utilized to supply water under pressure to the manifold 27 through the medium of the pump. A hub cap 90 is fixed on the adjacent end of the wheel 21 and the shaft 86 of the pump is operatively connected with the hub cap so that the gear 87 rotates with the wheel. It is preferred to provide an overload clutch 91 between the pump shaft 86 and the hub cap 90 to save the pump from excessive torque upon sudden rotation of the wheel 21, and to save the pump from injury in the event water freezes in the pump or pump lines. A stub shaft 92 is fixed to the hub cap 90 and projects inwardly toward the shaft 86 in alignment therewith. The friction plate elements of the clutch 91 are secured to the opposing ends of the aligned shafts 86 and 92. The overload clutch 91 may be spring loaded and may be of any well known type.

The invention further includes a system under the control of the hydraulic brake operating system for governing the delivery of water to the pump. This control system includes a supply tank or container 93 for the water to be used in cooling the brake mechanism. The container 93 may be arranged in any suitable location. A conduit or line 94 extends from the container 93 to the low pressure port 88 of the pump. A pressure responsive valve V controls the water supply line 94. The valve V is responsive to or operated by the pressure in the aforementioned line 33 which leads from the master cylinder 32 of the hydraulic brake system.

The valve V may be of the diaphragm or of the cylinder and piston type. As illustrated, the valve V has a cylinder 95 and a piston 96 operable in the cylinder. A port or groove 97 is provided in the piston 96 to allow the flow of fluid through the supply line 94 when the piston 96 is in a given position. A spring 98 is arranged under compression against the inner end of the piston 96 and normally holds the piston 96 in a position where the groove 97 is out of alignment with the line 94 so that the line is normally closed. A pipe or line 99 leads from the pressure line 33 of the hydraulic brake system and communicates with the outer end of the cylinder 95 so that the piston 96 is subjected to the pressures developed in the master cylinder 32. The spring 98 may be designed to resist any given pressure. In practice the spring resists movement of the piston 96 until a substantial braking action has occurred by reason of the development of considerable pressure in the master cylinder 32. Accordingly, the valve V remains closed to prevent the delivery of coolant or water to the pump until the maximum braking action is approached, whereupon the valve opens to allow the delivery of water to the pump, which in turn, supplies the water under pressure to the discharge tubes 28.

A conduit or line 100 leads from the high pressure port 89 of the pump to the manifold 27. In the construction illustrated the axle 10 is tubular and the lines 94 and 100 extend through the axle from the pump to the inner end of the axle.

In the operation of the apparatus, the valve V is normally closed and the pump is normally idle. In this connection, it is to be observed that water will not be trapped or contained within the lines 94 and 100 to be subject to freezing. Upon landing of the craft, the wheel 21 is rotated and the gear pump put into operation. However, as the valve V is closed, the pump cannot deliver water under pressure to the discharge manifold 27. When the brakes are applied, the initial pressures developed in the master cylinder 32 will be insufficient to overcome the spring 98 and the valve V is not opened until high or maximum braking pressures are developed. When such pressures are developed, the valve piston 96 is moved to a position where the groove 97 allows the flow of water from the container 93 through the line 94. This water is pumped to the manifold 27 under pressure by the pump. The water pumped to the manifold 27 is discharged from the tubes 28 to cool the drum 24, shoes 17 and other brake parts subject to overheating. When the operating pressure is removed from the piston 38 of the master cylinder 32, the pressures are relieved in the hydraulic brake system and the spring 98 restores the piston 96 to the closed position so that the water is no longer delivered to the pump.

Having described only a typical form of the invention, I do not wish to be limited to the specific details herein set forth, but wish to reserve to myself any variations or modifications that may appear to those skilled in the art or fall within the scope of the following claims.

I claim:

1. Cooling means for a brake mechanism having a drum presenting an internal braking surface, friction means for cooperating with said surface of the drum and a hydraulic pressure system operable to develop pressure for operating the friction means, the cooling means comprising an annular manifold within the drum for discharging water onto said surface of the drum having circumferentially spaced nozzles, water supply means, a pump operable to deliver water under pressure to said manifold, a conduit for conducting water from said supply means to the pump, and a valve in said conduit responsive to the pressure in said system to open when said pressure reaches a given valve.

2. In apparatus for use with landing gear having a landing wheel, the combination of a drum on the wheel having an internal braking surface, friction means operable into cooperation with the internal surface of the drum to brake rotation of the wheel; brake cooling means including an annular manifold within the drum having spaced means for discharging water against said surface, a water supply, and a pump driven by the wheel for pumping water from said supply to the water discharging means.

3. In brake apparatus for use with landing gear having a landing wheel, the combination of a drum on the wheel having an internal braking surface, friction means operable into cooperation with said surface to brake rotation of the wheel and a hydraulic pressure system for operating the friction means; brake cooling means including an annular manifold within the drum having spaced nozzles for discharging water against the drum, a water supply conduit, a pump for pumping water from said conduit to the manifold, a drive between the pump and wheel whereby rotation of the wheel operates the pump, and a valve in said conduit controlled by the pressure in said system to open only upon the development of a given pressure in said system.

4. In combination with a brake mechanism having a drum presenting an internal braking surface, friction means for cooperating with said surface of the drum and a hydraulic pressure system operable to develop pressure for operating the friction means; a cooling system comprising an annular manifold within the drum having spaced discharge means for discharging coolant onto said surface of the drum, pump means for supplying coolant under pressure to said discharge means, and means responsive to the pressures developed in said system for controlling the delivery of coolant to the pump means.

5. In combination with a wheel, friction elements for braking rotation of the wheel, brake cooling means including means for discharging coolant at the friction elements to cool the same, and means actuated by rotation of the wheel for pumping coolant to the last named means for discharge therefrom.

6. In combination with a wheel, friction elements having engaging friction surfaces for braking rotation of the wheel and a system for developing hydraulic pressure for operating the friction elements; cooling means comprising means for discharging coolant against said surfaces of the friction elements, pump means actuated by the wheel upon rotation of the same for pumping coolant to the discharge means for discharge therefrom, and means for supplying coolant to the pump means including a normally closed valve which opens to pass coolant to the pump upon a given pressure being developed in the hydraulic pressure system.

7. In combination with a wheel, friction elements for braking rotation of the wheel and a system for developing hydraulic pressure for operating the friction elements; cooling means comprising means for discharging coolant at the friction elements, pump means associated with the wheel to be actuated upon rotation of the wheel for pumping coolant to the discharge means for discharge therefrom, and means for supplying coolant to the pump means including a coolant supply line for carrying coolant to the pump means, a pressure responsive valve in said line, and means for imposing the pressure developed in the hydraulic pressure system upon said valve to open the valve.

8. In combination with a wheel, friction elements for braking rotation of the wheel and a system for developing hydraulic pressure for operating the friction elements; cooling means comprising means for discharging coolant at the friction elements, gear pump means associated with the wheel to be operated thereby upon rotation of the wheel for pumping coolant to said discharge means for discharge therefrom, a coolant supply conduit for conveying coolant to the pump means, and valve means in said conduit controlled by the pressure in said system to open only upon the development of a given pressure in said system.

9. In combination with a wheel, friction elements for braking rotation of the wheel and a system for developing hydraulic pressure for operating the friction elements; cooling means comprising means for discharging coolant at the friction elements, pump means for pumping coolant to the discharge means for discharge therefrom, a drive between the wheel and the pump means whereby the pump means is operated upon rotation of the wheel, an overload clutch in said drive, a conduit for carrying coolant to the pump means, and a valve in said conduit controlled by the pressure in said system to open only upon the development of a given pressure in said system.

JOHN J. BLOOMFIELD.

REFERENCES CITED

The following references are of record in the file of this patent:

UNITED STATES PATENTS

| Number | Name | Date |
| --- | --- | --- |
| 960,355 | Levin | June 7, 1910 |
| 1,059,222 | Smith | Apr. 15, 1913 |
| 2,102,181 | McCormick | Dec. 14, 1937 |
| 2,127,557 | Ells | Aug. 23, 1938 |
| 2,378,100 | Pogue | June 12, 1945 |